No. 884,411. PATENTED APR. 14, 1908.
R. NIELSEN.
ICE CREAM SCRAPER.
APPLICATION FILED APR. 6, 1907.
2 SHEETS—SHEET 1.
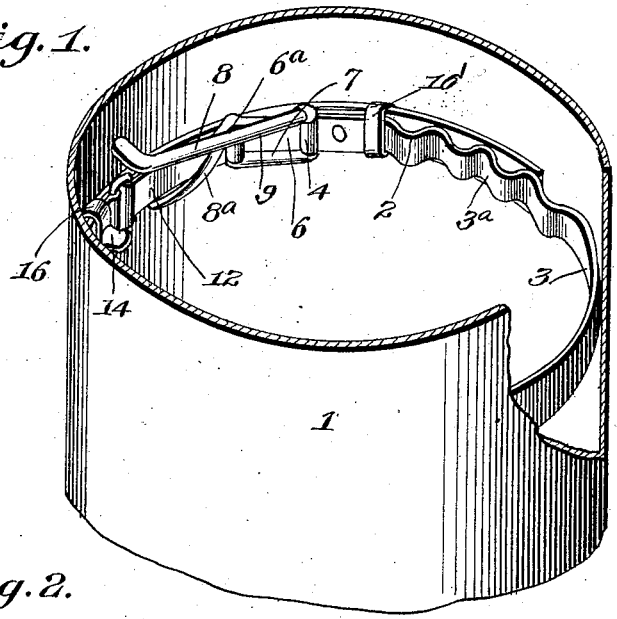
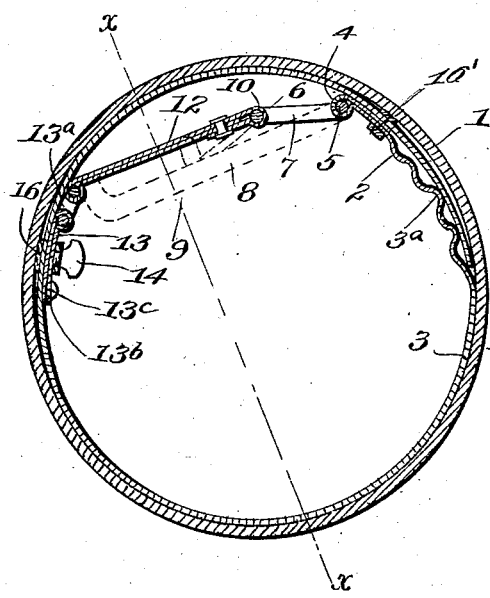
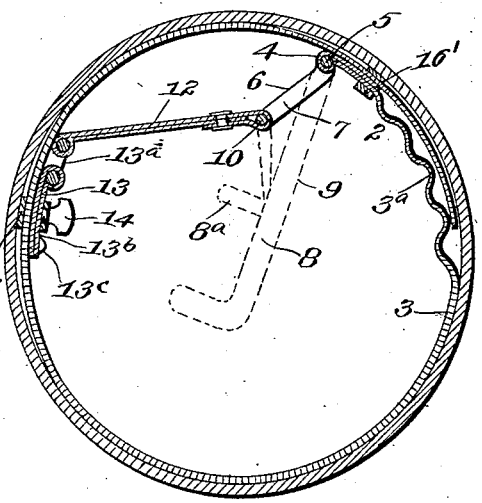
Witnesses
M. C. Lyddane
Helg. H. Murray
Inventor
Rasmus Nielsen
By
Attorney No. 884,411. PATENTED APR. 14, 1908.
R. NIELSEN.
ICE CREAM SCRAPER.
APPLICATION FILED APR. 6, 1907.
2 SHEETS—SHEET 2.
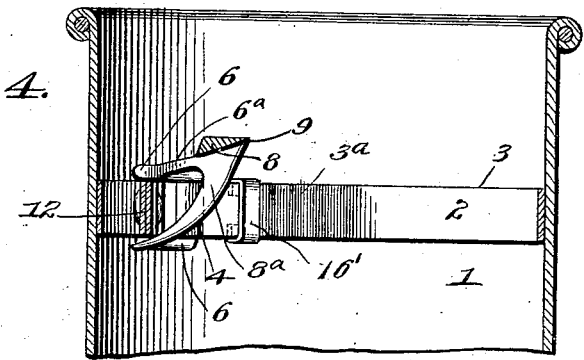
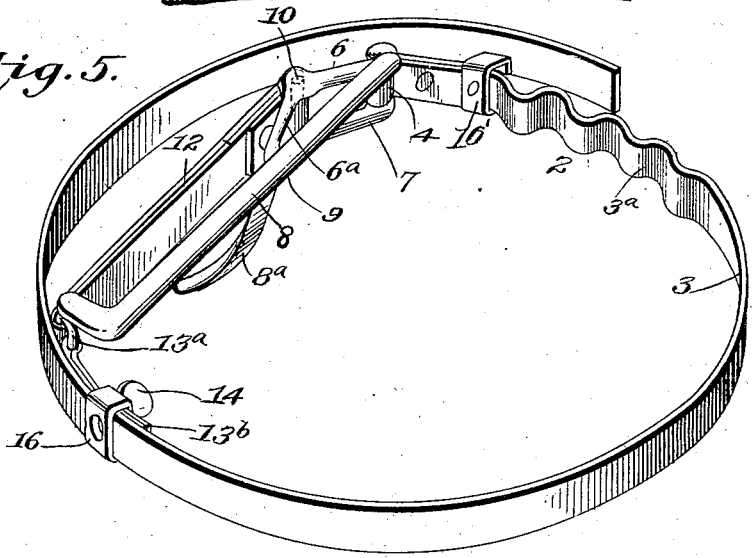
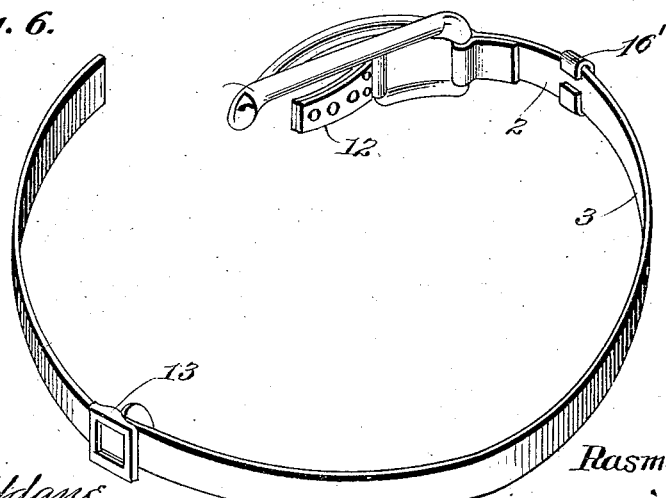
Witnesses
M. C. Lyddane
Helge H. Murray
Inventor
Rasmus Nielsen
By Th. Imrie
Attorney

UNITED STATES PATENT OFFICE.

RASMUS NIELSEN, OF TROY, NEW YORK, ASSIGNOR TO CATHERINE NIELSEN AND HENRY S. GILES, OF TROY, NEW YORK.

ICE-CREAM SCRAPER.

No. 884,411.        Specification of Letters Patent.        Patented April 14, 1908.

Application filed April 6, 1907. Serial No. 366,841.

*To all whom it may concern:*

Be it known that RASMUS NIELSEN, a citizen of the United States, residing at Troy, in the county of Rensselaer and State of New York, has invented a certain new and useful Improvement in Ice-Cream Scrapers, of which the following is a specification.

This invention relates to improvements in scrapers for ice cream cans.

In dishing out ice cream, the spoon is usually overloaded, which results in considerable loss to a dealer, and it is my purpose to arrange within an ice cream can a scraper located so that when the loaded spoon is being drawn from the can the surplus cream may be removed and an equal amount delivered to each customer.

The object of the invention is to provide a specific form of scraper and means for quickly and conveniently applying to any size can, within a given range, the scraper being locked in a fixed position to remove surplus cream from a spoon, the action of removing the cream tending to more rigidly fix said scraper in position.

A further object of the invention is to provide a fender to prevent the spoon, or what is generally termed "disher" from catching on the knife.

Other objects and advantages will be hereinafter referred to and particularly pointed out in the claims.

In the drawings—Figure 1 is a perspective view of an ice cream can, partially broken away to illustrate the invention. Fig. 2 is a horizontal sectional view, taken through the attachment. Fig. 3 is a view similar to Fig. 2, previous to locking the scraper in position. Fig. 4 is a vertical transverse section on the line $x$—$x$, Fig. 2. Fig. 5 is a perspective view of the attachment separated. Fig. 6 is a view of a modified form of my invention.

1, indicates an ordinary ice cream can, and 2, my improved scraper attachment. The attachment 2, consists of a thin band 3, of spring metal provided at or near one end with a series of corrugations $3^a$, adjacent which and at the end of the band is a bearing 4, to receive a bar 5, of a scraper frame 6.
The corrugations $3^a$, add resiliency to the band to facilitate locking the device in the can. Were it not for these corrugations the band would likely buckle if not properly set to secure it in position. The scraper frame 6, is formed with a connecting bar 7, and connecting the upper ends $6^a$, of the frame is a scraper 8, formed on its inner side with a scraping edge 9. The scraper 8, extends beyond the frame 6, the free end being turned in toward the can and adapted to rest against the latter when the attachment is in use. Depending from the scraper is a fender $8^a$, which is flush with the scraping edge 9, and inclines downwardly toward the can. The function of the fender is of considerable importance, in that it avoids the annoyance to the operator, of the spoon catching the scraper when the "disher" is drawn across the scraping edge, it cannot be caught by the latter, because of the fender being in its path of travel. In withdrawing the disher toward the scraper it first contacts with the fender, and the latter acts as a cam in guiding the edge of the disher to the edge of the scraper without causing the former to be caught by the latter. On a bar 10, of frame 6, is pivotally mounted a link 12, the other end of which is connected with an adjustable stop 13, by a second link connection $13^a$. The stop 13, is provided with an extension $13^b$, having an outwardly projecting lug $13^c$, and is fixed in position on band 2, by a set screw 14, and a keeper 16, the latter encircling the extension $13^b$, and the band 2. A keeper $16'$, is freely mounted on the band 2, to retain the overlapping ends thereof in position.

In operation the band 2, is adjusted to fit within the can 1, and the stop 13, is properly located by the set screw 14, the link 12, and its connections forming with frame 6, a toggle. The band having been adjusted, pressure is applied to the scraper to force it toward the side of the can which tends to expand said band outward and binds it against displacement. The parts are proportioned so that just before the frame 6, reaches its limit of movement, the toggle breaks its alinement and the spring pressure of band 2, throws frame 6, and the scraper toward the side of the can and holds the attachment securely in position.

In Fig. 6 I have shown a modified form of my invention, which consists of a pawl 12, adapted to abut against a stop 13. In this construction, however, when the band is disengaged from the can its ends spread apart and make it somewhat difficult to apply the attachment, whereas by holding the stop as previously described, the ends of the band do not become disengaged.

What I claim is—

1. An ice cream scraping attachment, comprising a band, a stop on the band at or near one end of the band, a scraper pivotally mounted on the band, and a toggle connection between the point of connection of the scraper to the band, and the stop to lock the attachment in position.

2. A scraping attachment comprising a scraper, means supporting the scraper, a stop, and a toggle connection between the supporting means and the stop to lock the attachment in position.

3. A scraping attachment, comprising a scraper, a pivoted frame supporting the scraper, a link pivoted to the frame, means supporting the frame, and a stop coöperating with the link to secure the attachment in position.

4. A scraping attachment, comprising a band, a frame pivotally mounted on the band, a link mounted on the frame, a stop operable on the band with which the link coöperates to fix the attachment in position, and a scraper carried by the frame.

5. A scraping attachment comprising a yielding strip adapted to be bent into a continuous band, a stop mounted on the band, a scraper pivoted to the strip, and a scraper overhanging the continuous band, and locking means operable by the scraper for securing the attachment in position.

6. A scraping attachment comprising a band, a keeper for holding the two overlapping ends of the band together, an adjustable stop coöperating with the band, means for adjusting the stop, a frame pivotally mounted on the band, a link pivotally mounted on the frame, said link adapted to coöperate with the stop to lock the attachment in position, and a scraper carried by the frame.

7. A scraping attachment comprising a band, a toggle connection operable on two points of the band for securing the band in position, and a scraper having one end secured to the band, said scraper overhanging the band and adapted to be used for operating the toggle connection.

8. A scraping attachment comprising a band, a stop, a link coöperating with the stop, an overhanging scraper, the scraper and the link forming a toggle connection to secure the attachment to a can.

9. A scraping attachment comprising a band, a stop carried by the band, a link coöperating with the stop, and a pivotally mounted overhanging scraper, the scraper and the link forming a toggle connection to secure the attachment in position.

10. A scraping attachment comprising a band, means for locking the band in position, and a pivotally mounted overhanging scraper beveled on its edge, and movable with the locking means, and adjusted to be turned on its pivot to position it when the locking means is operated.

11. A scraping attachment comprising a band, a toggle connection for locking the band in position, and a scraper operable with and forming part of the toggle connection, said scraper serving as a means by which the toggle connection may be operated.

12. A scraping attachment comprising a band, a scraper overhanging the band, a spoon fender depending from the scraper, and means for locking the scraper and band to a can.

13. A scraping attachment, comprising a scraper, a fender depending from the scraper and flush with the scraping edge, and means for securing the scraper to a can.

14. A scraping attachment, comprising a scraper, a fender depending from the scraper and flush with the scraping edge and extending outwardly toward the outer edge of the scraper, and means for securing the scraper to a can.

15. A scraping attachment, comprising a band having its ends overlapping and formed at one end with a series of corrugations, a keeper loosely holding the overlapping ends together, a frame pivotally connected to the band, a scraper carried by the frame, an adjustable stop mounted on the band, and a toggle connection between the frame and the adjustable stop to lock the scraper and band in position in a can.

16. A scraping attachment, comprising a band having its ends overlapping and formed at one end with a series of corrugations, a keeper loosely holding the overlapping ends together, a frame pivotally connected to the band, a scraper carried by the frame, an adjustable stop mounted on the band, and a toggle connection between the frame and the adjustable stop to lock the scraper and band in position in a can, and a fender depending from the scraper.

17. A scraping attachment, comprising a band, a scraper pivoted thereto, said scraper having a projection to bear against a can to limit its movement, and a toggle connection for locking the band and scraper in position in a can.

18. A scraping attachment, comprising a band, a scraper pivoted thereto, said scraper having a projection to bear against a can to limit its movement, and a toggle connection for locking the band and scraper in position in a can, and a fender depending from the scraper.

19. A scraping attachment comprising a band having its ends overlapping, a scraper pivotally connected to the band, a toggle connection coöperating with the scraper to lock same in place in a can, an adjustable stop pivotally connected to the toggle connection, a keeper for holding the toggle connection in place, a projection on the adjustable stop to limit its movement against the keeper, and means for locking the adjustable stop in position on the band.

In testimony whereof I affix my signature, in presence of two witnesses.

RASMUS NIELSEN.

Witnesses:
L. H. GILES,
JOHN H. GILBERT.